J. AND F. NELSON.
GRADER.
APPLICATION FILED APR. 14, 1920

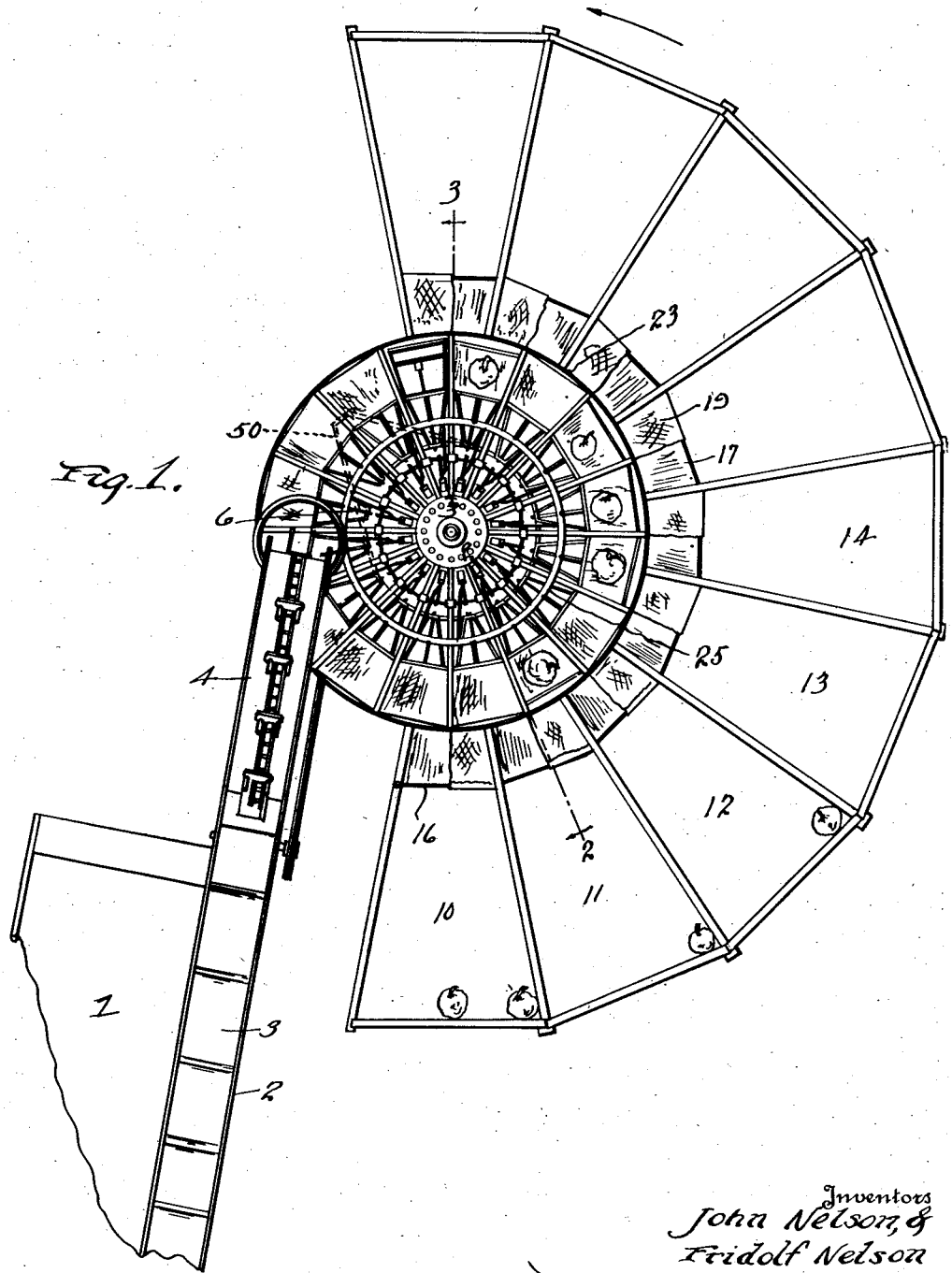

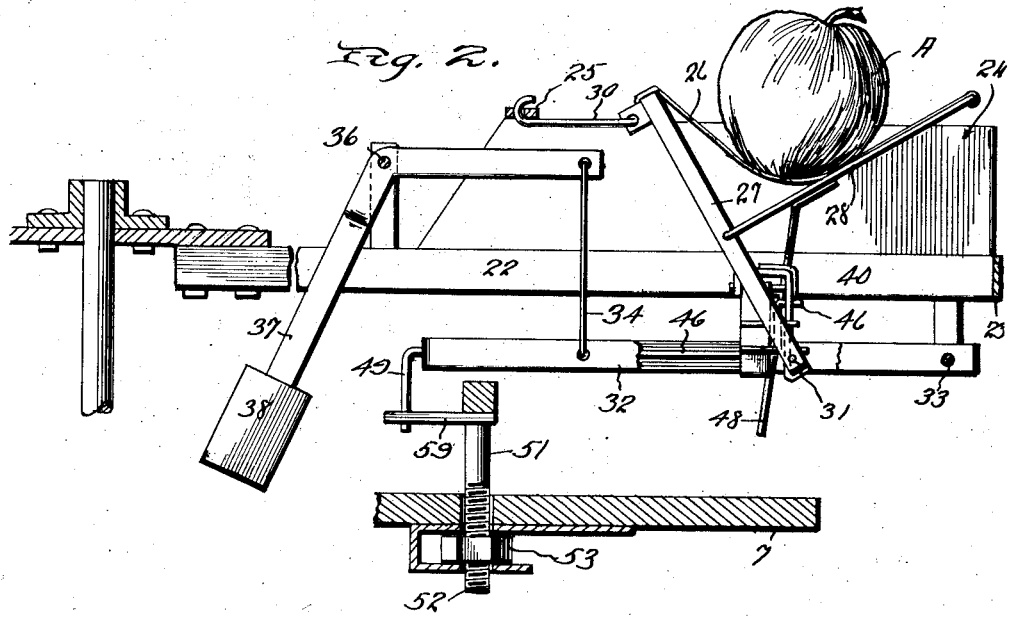
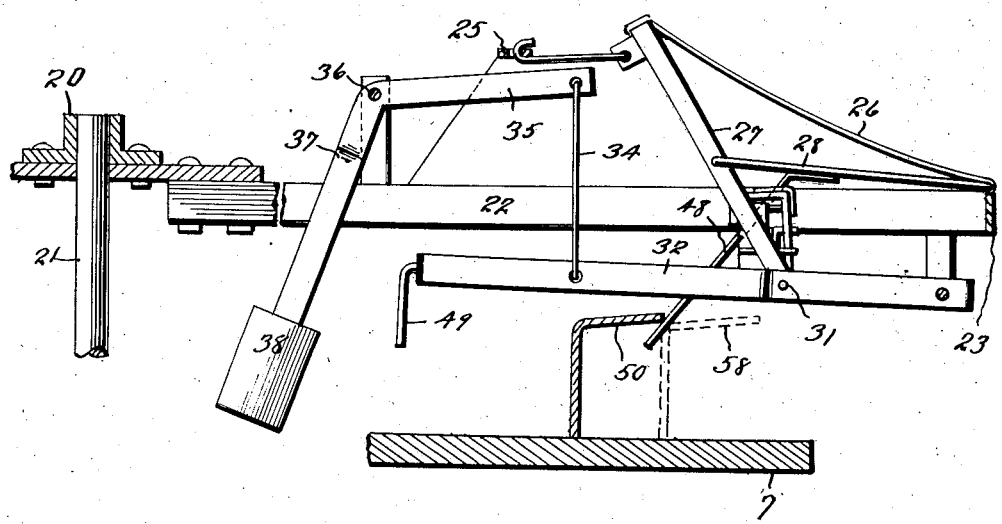

1,355,999.

Patented Oct. 19, 1920.
3 SHEETS—SHEET 3.

Inventor
John Nelson &
Fridolf Nelson

By
Attorneys

UNITED STATES PATENT OFFICE.

JOHN NELSON AND FRIDOLF NELSON, OF NORTH YAKIMA, WASHINGTON.

GRADER.

1,355,999.  Specification of Letters Patent.  Patented Oct. 19, 1920.

Application filed April 14, 1920. Serial No. 373,737.

*To all whom it may concern:*

Be it known that we, JOHN NELSON and FRIDOLF NELSON, citizens of the United States, residing at North Yakima, in the county of Yakima, State of Washington, have invented certain new and useful Improvements in Graders; and we do hereby declare the following to be a full, clear, and exact description of the invention, such as will enable others skilled in the art to which it appertains to make and use the same.

This invention is a grader whose broad purpose is to take a number of units such as pieces of fruit of different sizes and weights, and automatically deposit them into separate bins or receptacles in grades according to weight, and in the following specification the machine is described as employed for grading apples. Of course it could operate on other kinds of fruit, and in fact on other articles than fruit, although the articles would have to be in the form of individual units.

The primary object of the invention is to save labor, and this is accomplished by constructing the machine in the form of a number of buckets carried in a large wheel-like frame work revolving on a vertical axis, the apples being fed one by one to the buckets at one point and carried thence around and automatically dumped from the buckets into bins according to the weight of the respective apple.

The invention comprises general structure whereby this object is obtained, as well as details including the means for dumping the buckets and for resetting them, the means for adjusting the parts to cause the dumping action to take place opposite any desired bin, etc.

Reference is made to the following specification for a description of one successful manner of carrying out the idea. In the drawings herewith—

Figure 1 is a plan view of the machine in its entirety, showing buckets in different positions and certain of them with their flexible bottoms omitted.

Fig. 2 is an enlarged section on the line 2—2 of Fig. 1 showing a bucket containing an apple and the parts in position where this apple is just about to be dumped.

Fig. 3 is a similar section on the line 3—3 of Fig. 1 showing a bucket already dumped and about to be reset.

Figure 4:
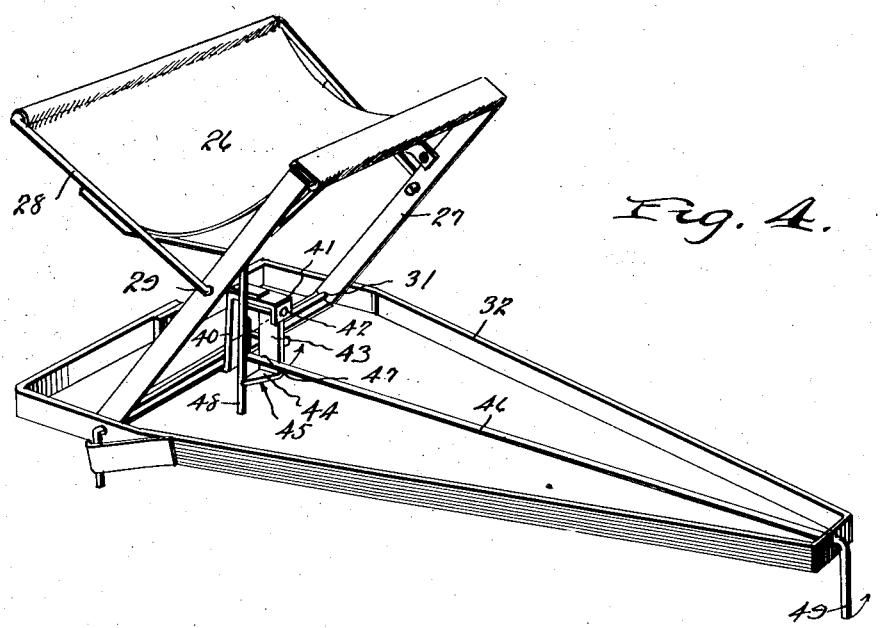
Fig. 4 is an enlarged perspective view, more especially of the latch mechanism for holding a bucket after it has been reset.
Figure 5:
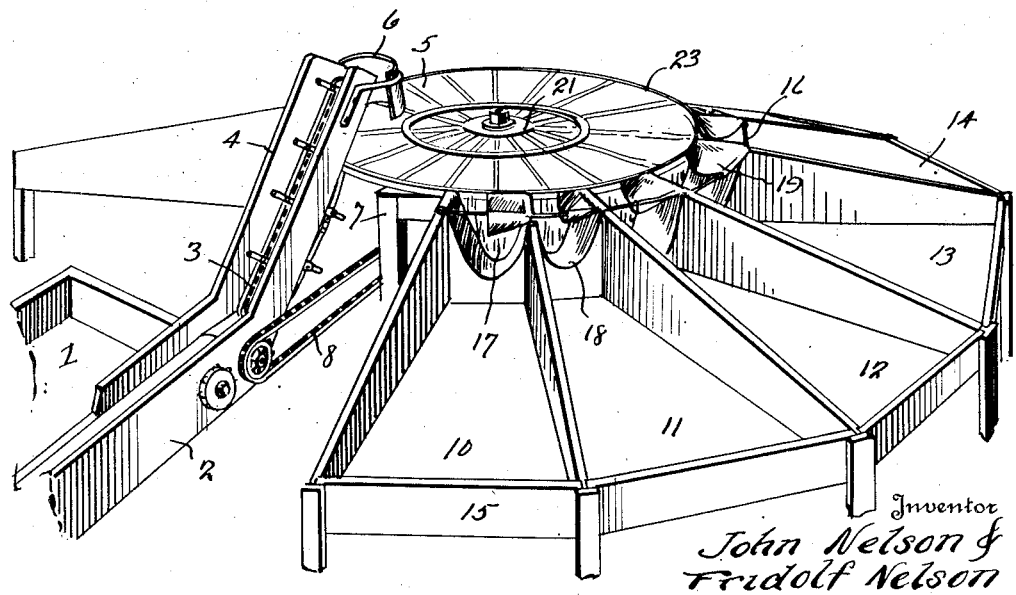
Fig. 5 is a general perspective view of the entire machine, showing more particularly the details of the feeder and the bins and illustrating the wheel in outline only.

Alongside a tray or table 1 extends a trough 2 containing a conveyer in the form of an endless carrier 3, leading in the present case to an elevator 4, over whose outlet an apron 5 is hung on the support 6. The construction is such that apples may be poured in bulk on the table and fed from it by an attendant to the conveyer, wherein they are carried along to the elevator and dropped one by one into the buckets of the rotary carrier yet to be described. The latter consists primarily of a large wheel supported on a table or base 7, and the numeral 8 designates broadly the mechanism for driving the conveyer and elevator and rotating the wheel at such speed that its buckets will come under the delivery end of the elevator and receive the apples one by one.

Around a considerable portion of the wheel are disposed bins herein numbered 10, 11, 12, 13 and 14, and each composed by preference of an inner end and two sides and a bottom of wood, with a gate 15 at its out end. Rods 16 are strung across the inner ends of these bins, and the rods support a pocket 17 hanging within each bin and having its sides converging to an outlet 18, and also a baffle 19 above part of the mouth of the pocket. The purpose is that each apple dumped by a bucket will fall onto a baffle of canvas or the like, being dropped into a pocket, also of fabric, and by the latter being dropped gently into a wooden bin so as not to bruise the fruit. While not necessary to illustrate, it is clear that the bins could be made in one or more banks, or might be made separate and possibly mounted on casters so that they could be moved into and out of position at will, and so that when drawn back from the wheel ready access could be gained to the latter.

The so-called carrier comprises a hub 20 mounted fast on an upright shaft 21 and carrying a number of radial arms or spokes 22 which will preferably be connected by a band or rim 23 around their extremities, and rising from the outer portions of these spokes are partitions 24 whose inner ends may be connected by an overlying band or ring 25. Each two contiguous partitions constitute the sides of a bucket, the bottom 26 of which is a flexible strip as of canvas. The inner end of this strip is supported on the main frame 27 of the bucket structure, and the outer end is attached to a swinging frame 28 which is pivoted to the main frame at 29 so that when swung inward to slacken the strip the bottom of the bucket may descend under the weight of an apple A, as seen in Fig. 2, and the apple will be retained therein, the partitions 24 serving as the sides of the bucket. When the swinging frame 28 is permitted to drop from the position shown in Fig. 2 to that shown in Fig. 3, the bucket is dumped and the apple rolls off its bottom into the bin that happens to be opposite.

The upper end of the main frame of the bucket is loosely connected with the ring 25 by a link 30 and the lower end of this frame is pivoted at 31 to a lever of the second class which we will call the bucket beam 32, the same being pivoted at its outer end 33 in hangers depending from the spokes 22. A link 34 connects this beam with the outer arm of a lever of the first class which we will call the weight beam 35, fulcrumed at 36 between standards rising from the spokes. The lever 32 is straight, although as seen in Fig. 4, it is a frame substantially triangular in plan view so as to afford two pivotal points for supporting the bucket frame 27; but the lever 35 has its inner arm 37 deflected obliquely downward for a purpose yet to appear, and a weight 38 is mounted thereon. Thus the weight of the apple A constitutes the load applied at the point 31 to the bucket beam, the inner end of the latter descends and the link 34 draws down the outer arm of the weight beam 35, and this causes the rise of the inner arm and weight 38, the latter becoming more and more effective as it rises, because in its rise it swings away from a vertical line through the fulcrum 36. Hence it will be clear that the weight can be adjusted on the arm 37 to render the structure extremely sensitive, for the purpose of grading apples which differ from each other in weight only by fractions of an ounce.

The latch mechanism for holding the buckets set is perhaps best seen in Fig. 4, as well as means for tripping the same. Rising from the lower bar of the frame 27 is a standard 40 whose upper end is turned over and downward as at 41, and mounted on a pivot 42 through the bar and its down turned end is a latch 43 having its lower end bent inward into a tip 44 standing adjacent the standard, the tip being beveled off at its inner edge 45. A finger 48 hangs rigidly from the swinging frame 28, and when it is engaged by the tip 44 of the latch, this frame is held so that the bottom 26 of the bucket is dished, as seen in Fig. 2; and when the latch is swung aside to release the finger, the swinging frame may move to dump the bucket, as shown in Fig. 3. Part of the mechanism for tripping the latch is shown in Fig. 4, and consists of a rod 46 extending longitudinally within the bucket beam 32 and journaled in the standard 40, the rod having an elbow 47 adjacent the latch and turned downward at its inner end in a crank 49.

The entire wheel rotates above what might be called a track fixedly carried by and extending around the base 7. This track includes a rail which is circular for most of its length, as seen at 50, but which is interrupted at one point adjacent the mechanism for feeding the apples to the wheel. Here the track has a cam rail 58 which is so shaped tangentially to the circular portion that in the passage of every bucket over this part of the track its finger 48 is borne outward and caused to ride past the beveled edge 45 of the tip of the latch, the latter falling in behind the finger so as to reset the bucket after it has been dumped. Along the circular portion of the track are a number of posts 51 extending down through some element of the base 7 and threaded as at 52 for the reception of nuts 53, and by adjusting the latter the posts may be set higher or lower. These posts carry horizontal stops 59 standing in the path of the pendant cranks 49 of the trip rods 46, as seen in Fig. 2.

The operation is as follows: The apples are fed one by one into the buckets, and in the rotation of the wheel these buckets move successively past the bins. The stop 59 opposite the first bin is set quite low, the next a little higher, and so on. A large and heavy apple will throw enough load onto the point 31 to swing the beam 32 downward farther than a lighter apple, as is obvious, the downward movement of this beam being resisted by the upward movement of the weight 38 on the pendulum arm 37 of the beam 35. Therefore, the inner end of the trip rod will be depressed by a heavy apple to a point where its crank 49 will strike the stop 59 which has been set the lowest, whereas the tripping crank beneath a bucket containing a lighter apple will pass over this stop and strike some other which has been adjusted a little higher. The result will be that the buckets will be dumped at points dependent on the weight of the apples they contain, and each apple as it is dumped by a bucket is eased by the baffle 19 and pocket 17 into its appropriate bin. Continued rotation of the wheel carries the buckets around until their fingers 48 engage and move along the cam rail 58, whereby they are reset ready for renewed action.

The two beams and their connecting link 34 serve in the nature of a compound scale beam, whereof 38 is the weight and 26 is the pan for the load. While the weight of the latter causes the free end of the bucket beam 32 to descend, the weight beam 35 is bent so that as one arm descends with the beam 32 the other arm 37 carrying the weight 38 swings outward and upward like a pendulum. If this beam 35 were straight, any weight in a pan sufficient to depress the beam 32 would rock the beam 35 and raise the weight; and, excepting for cases where the load exactly counterbalanced the weight, such structure would not permit the free end of the bucket beam and therefore the crank 49 to descend accurately to different distances according to the varying weights of the units. By employing a pendulum arm 37 to carry the weight, each ounce increase in the weight of a unit in the pan will swing the arm 37 a little farther from a plane through its fulcrum 36, the weight becoming more and more effective as it rises; whereas, as soon as the load is dumped from the pan, the weighted arm 37 falls to nearly a vertical position, coming to rest at a point where the weight is effective to overcome that of the remainder of the scale mechanism without any load.

It is quite evident that, in order to use this machine for grading other units than apples for instance, it might be necessary to adjust the weights on the arms 37 to produce the same results; and if the difference in weight of various grades of units is considerable, it will be necessary to adjust the height of the stops accordingly. In the event that the feed mechanism should fail to deliver the apple to any bucket, the beam beneath the latter will not be depressed at all and therefore its crank 49 will not strike any of the stops; it will continue on its course without being tripped, and will not have to be reset. The apron 5 is so adjusted over the delivery end of the elevator as to permit the passage of an apple of the largest size, but prevent the passage of two apples of the smallest size; but this and other details may be left to the manufacturer.

What is claimed as new is:

1. In a machine of the class described, the combination with a beam pivoted at one end, a beam pivoted between its ends and having one arm lapping the first beam and the other arm carrying a weight, and a link connecting the beams where they lap; of a dumping bucket supported by the first beam between its pivot and said link, means for holding said bucket closed, a trip for said means carried by the first beam and depending from its free end, and a stop for coaction with said depending trip according to the weight of the material in the bucket.

2. In a machine of the class described, the combination with a beam pivoted at its outer end, a beam pivoted between its ends and having one arm lapping the first beam and the other arm bent downward and carrying a weight, and a link connecting the beams where they lap; of a bucket supported by the first beam between its pivot and said link, means controlling the dumping of said bucket, a trip for said means carried by the first beam and depending from its inner end, and a stop for coaction with said depending end according to the weight of the material in the bucket.

3. In a machine of the class described, the combination with a bucket including two frames pivotally connected with each other and one having a depending finger, and a flexible sheet connecting said frames; of a supporting frame in which the said bucket frames are pivotally mounted, a latch automatically engaging said finger when the bucket is closed, and means for swinging said latch to disengage the finger and permit the bucket to dump.

4. In a machine of the class described, the combination with a bucket including two frames pivotally connected with each other and one having a depending finger, and a flexible sheet connecting the upper ends of said frames; of a standard rising from the lower bar of one frame and away from which said finger moves in the dumping of the bucket, a latch pivoted in said standard and having its tip bent to normally engage the finger when the bucket is closed, and trip mechanism for swinging the latch to release the finger and permit the bucket to dump.

5. In a machine of the class described, the combination with a bucket including two frames pivotally connected with each other and one having a depending finger, and a flexible sheet connecting the upper ends of said frames; of a supporting frame in which the other bucket frame is pivotally mounted, a latch automatically engaging said finger when the bucket is closed, and a trip rod having an elbow for swinging said latch to disengage the finger and permit the bucket to dump.

6. In a machine of the class described, the combination with a wheel whose spokes have upright partitions near their outer ends, each two contiguous partitions constituting ends of a bucket, a triangular frame pivoted between said spokes to rise and fall at its inner end, and a tripper carried by this frame; of a bucket consisting of hingedly connected frames pivoted in said triangular frame and having a depending finger, and a fabric strip connecting the two bucket frames and with said partitions completing the bucket, and latch mechanism carried by said main frame and engaging the finger when the bucket is set, the latch mechanism being released by said tripper.

7. In a machine of the class described, the combination with a wheel whose spokes have upright partitions near their outer ends, each two contiguous partitions constituting ends of a bucket, a triangular frame pivoted at its outer end between said spokes, means for controlling the rise and fall of its inner end, and a tripper carried by this frame; of a bucket consisting of a main frame pivoted at its lower end in said triangular frame, a swinging frame pivoted to the main frame and having a depending finger, and a fabric strip connecting the upper ends of the two bucket frames and with said partitions completing the bucket; and latch mechanism carried by said main frame and engaging the finger when the bucket is set, the latch mechanism being released by said tripper.

8. In a machine for grading units, the combination with a rotary carrier having spokes, dumping buckets supported between the outer ends of said spokes and each having a depending finger, a latch engaging said finger when the bucket is set, trip mechanism therefor including a crank, and means for permitting the weight of the unit in each bucket to adjust the height of said crank; of means for feeding units to the bucket at one point in the rotation of the carrier, a series of bins around the carrier for receiving the graded units, stops opposite said bins and at different heights to engage said cranks and deliver units of different grades to the respective bins, and a cam rail fixed beneath the carrier between the last bin of the series and said feed mechanism in position to be engaged by the fingers to reset the buckets.

9. In a fruit grading machine, the combination with a rotary carrier having buckets, and means for dumping the latter at selected points; of bins around the carrier for receiving the fruit dumped therefrom, each bin having at its inlet end a fabric pocket whose walls converge downward to an outlet delivering the fruit into the bin, and a fabric baffle secured over part of the mouth of said pocket, for the purpose set forth.

In testimony whereof we affix our signatures in the presence of two witnesses.

JOHN NELSON.
FRIDOLF NELSON.

Witnesses:
J. A. LONDON,
CLARA N. NELSON.